United States Patent
Matsumoto et al.

[11] Patent Number: 5,647,288
[45] Date of Patent: Jul. 15, 1997

[54] SCRAP CONVEYOR HAVING IMPROVED SCRAP PRE-HEATING CONSTRUCTION

[75] Inventors: Hiroshige Matsumoto; Makoto Takahashi; Hitoshi Kuroda, all of Kitakyushu, Japan

[73] Assignee: Nippon Steel Corporation, Tokyo, Japan

[21] Appl. No.: 397,081

[22] PCT Filed: Oct. 8, 1993

[86] PCT No.: PCT/JP93/01457

§ 371 Date: Mar. 8, 1995

§ 102(e) Date: Mar. 8, 1995

[87] PCT Pub. No.: WO94/09332

PCT Pub. Date: Apr. 28, 1994

[30] Foreign Application Priority Data

Oct. 16, 1992 [JP] Japan .................. 4-072287
Mar. 11, 1993 [JP] Japan .................. 5-016325
May 20, 1993 [JP] Japan .................. 5-031257

[51] Int. Cl.$^6$ .................................. D06F 75/00
[52] U.S. Cl. .................. 110/228; 110/257; 110/270; 432/152; 432/159; 432/242
[58] Field of Search .................. 110/227, 228, 110/108, 257, 258, 270, 271, 293; 266/158, 901; 432/87, 93, 121, 120, 152, 159, 239, 242, 245

[56] References Cited

U.S. PATENT DOCUMENTS

| 3,301,662 | 1/1967 | Ban . |
| 3,667,474 | 6/1972 | Graybill . |
| 4,676,742 | 6/1987 | Kozierox . |

FOREIGN PATENT DOCUMENTS

| 0 420 776 | 4/1991 | European Pat. Off. . |
| 19 21443 | 11/1970 | Germany . |
| 4-236730 | 8/1992 | Japan . |
| 4-309789 | 11/1992 | Japan . |

Primary Examiner—Henry A. Bennett
Assistant Examiner—Susanne C. Tinker
Attorney, Agent, or Firm—Kenyon & Kenyon

[57] ABSTRACT

In a scrap conveyor for feeding a scrap to a processing furnace such as an arc furnace, etc., while pre-heating the scrap by an exhaust gas from the processing furnace, the periphery of the scrap conveyor is covered with a gas seal cover, a flue is disposed above the scrap conveyed, an exhaust gas passage portion is disposed below the scrap conveyor, and an exhaust gas suction duct opening to the exhaust gas passage portion through an exhaust gas suction space is disposed. In the conveyor, an exhaust gas flow passage for allowing the exhaust gas inside the flue to pass through the scrap from its surface layer to its lower layer is formed inside the layer of the scrap, so that pre-heating of the scrap can be efficiently effected throughout the whole layer of the scrap.

16 Claims, 5 Drawing Sheets

SCRAP CONVEYOR HAVING IMPROVED SCRAP PRE-HEATING CONSTRUCTION

TECHNICAL FIELD

The present invention relates to an apparatus for conveying scrap to a processing furnace for melting a metallic material, and refining a molten metal, such as an arc furnace.

BACKGROUND ART

Charging of a scrap into a processing furnace used for melting a metallic material, refining a molten metal, etc, such as an arc furnace, is carried out generally in the following way.

The scrap is charged in advance into a container referred to as a "bucket" and this bucket is transported to a position near the arc furnace by a ceiling crane. A turnable furnace cover is provided to the arc furnace. When the scrap is charged, this furnace cover is turned and opened. Then, the bucket is moved onto the furnace and the bottom portion of the bucket is opened so as to charge the scrap into the furnace.

Charging of the scrap into the arc furnace is carried out, in a batch-method, twice or thrice per heat. According to this method, however, the problem is that the furnace cover must always be opened at the time of charging of the scrap and consequently, heat radiation from the furnace is great. Another problem is that an operation environment is deteriorated due to the generation of dust, etc.

Accordingly, various methods of continuously charging scrap have been proposed as methods of charging scrap into the furnace without opening the furnace cover. In the furnace operation in this case, a melting operation is started while a suitable amount of a molten steel is left over from the previous tapping operation. Therefore, the operation is carried out in the conventional refining state from the initial stage of melting.

In the operation in the condition of the refining stage, it becomes very important to suitably maintain the thickness of a slag on the molten steel in order to improve arc heat efficiency, and generally, this is effected by the generation of a CO gas resulting from the reaction of carbon and oxygen. Consequently, the quantity of the gas generated from the furnace becomes greater than in the conventional method. In other words, a technology of efficiently recovering the heat of the exhaust gas becomes important. Japanese Unexamined Patent Publication (Kokai) No. 4-42452, for example, discloses a technology of charging scrap into a furnace by introducing the exhaust gas into a scrap conveyor having a flue formed therein and passing the exhaust gas in a counter-flow arrangement to the movement of the scrap so as to pre-heat the scrap.

However, such a scrap conveyor has the construction wherein the exhaust gas flows above the scrap inside the conveyor having the flue formed thereon. Since pre-heating of the scrap is applied only to the surface layer portion of the scrap and heat is not sufficiently transferred to the scrap in the lower layer portion. To raise the pre-heating temperature, therefore, it is necessary to either enlarge the transverse width of the conveyor so as to enlarge the heat transfer area, or to elongate the length of the conveyor so as to secure a long pre-heating time. In other words, a problem develops in that the setup becomes greater in size.

Further, a gas seal is difficult at a portion at which the scrap on the conveyor enters the flue, and external air is sucked simultaneously with the suction of the exhaust gas. Accordingly, dust collection efficiency drops, as well.

Also, each of U.S. Pat. No. 3,301,662 (FIGS. 1 to 6) and European Patent Publication No. 420,776 (FIG. 1) discloses a conveyor for feeding scrap to a processing furnace while preheating the scrap by the exhaust gas from the said furnace. The conveyor is covered by a gas seal cover and a flue is formed between the cover and the scrap on the conveyor, the exhaust gas being introduced into the flue. An exhaust gas passage portion or suction space is present below the conveyor, an exhaust gas suction duct opening to the gas passage portion or suction space such that the exhaust gas inside the flue passes through the scrap on the conveyor and is sucked and discharged.

However, none of the above references describe that a scrap reception hopper having upper and lower covers capable of being opened and closed is disposed above a scrap charging portion of said scrap conveyor, a tapping device for said scrap conveyor is disposed below said hopper, and peripheries of said hopper, said tapping device and the conveyor are covered with a gas seal cover and that an exhaust gas passage portion is disposed between a bottom plate and side plate of the conveyor.

DISCLOSURE OF THE INVENTION

The present invention aims at solving the problems described above. In a scrap conveyor for feeding scrap to a processing furnace such as an arc furnace, etc, while pre-heating the scrap by the exhaust gas from the processing furnace, the present invention employs the construction wherein the periphery of the scrap conveyor is covered with a gas seal cover, a flue is disposed above the conveyed scrap, an exhaust gas passage portion is disposed below the scrap conveyor, and an exhaust gas suction duct opening to the exhaust gas passage portion is disposed through an exhaust gas suction space. According to such a conveyor, the exhaust gas flow passage which allows the exhaust gas in the flue to pass through the surface layer to the lower layer of the scrap is formed inside the layer of the scrap, and pre-heating of the scrap can be carried out extremely efficiently throughout all the layers of the scrap.

In other words, the high temperature exhaust gas generated inside the furnace is introduced into the scrap conveyor having the flue formed therein, and passes above the scrap on the conveyor and at the same time, a part or the full amount of the exhaust gas passes through the layers of the scrap and then through the exhaust gas passage portion below the conveyor and is discharged to the exhaust gas duct through the space facing the passage portion.

Due the flow of the exhaust gas described above, the surface layer portion of the scrap is pre-heated by the convection of the exhaust gas and by radiation heat transfer. Since the heat transfer due to convection of the exhaust gas passing through the inside of the scrap layer adds to the conduction heat transfer between the scraps, even the lower layer portion of the scrap in the conveyor can be pre-heated. Generally, the convection heat transfer quantity is far greater than the conduction heat transfer quantity between the scraps. Accordingly, the pre-heating effect can drastically be improved.

When the scrap conveyor is constituted by an apron conveyor system, it is preferred to form an exhaust gas passage portion having a slit-like or grid-like hole structure in the bottom plate of the conveyor, and when the conveyor is constituted by a vibration conveyor system, it is preferred to dispose a slit-like exhaust gas passage portion between the bottom plate and side plates of the conveyor. In this case, even if the scrap is dust from punching thin plates, needlelike dust, etc, the problem of clogging of the exhaust gas passage portion can be effectively solved.

In the scrap charging portion of the conveyor, a scrap reception hopper having upper and lower covers capable of being opened and closed is disposed above the conveyor while a device which tap the scrap conveyor to the scrap conveyor is disposed below the hopper. Further, the hopper and the tapping device are covered with the gas seal cover described above. According to this construction, the condition of the internal atmosphere of the gas seal cover can be arbitrarily controlled, and moreover, external air can be cut off. Therefore, this construction is convenient for operating the conveyor.

Needless to say, it is further possible to introduce an exhaust gas from an exhaust gas generation source in other systems in order to control the temperature and quantity of the exhaust gas inside the gas seal cover.

Moreover, when the exhaust gas duct is located at the side of a conveyor and the exhaust gas is discharged to the exhaust gas duct through the space facing the passage portion which is disposed between a bottom plate and a side plate of the conveyor, this conveyor has a simpler shape and is more easily formed and can more easily convey the scrap to an area for charging the scrap than the above prior arts.

BEST MODE FOR CARRYING OUT THE INVENTION

The present invention will be described in detail with reference to the accompanying drawings.

Figure 1:
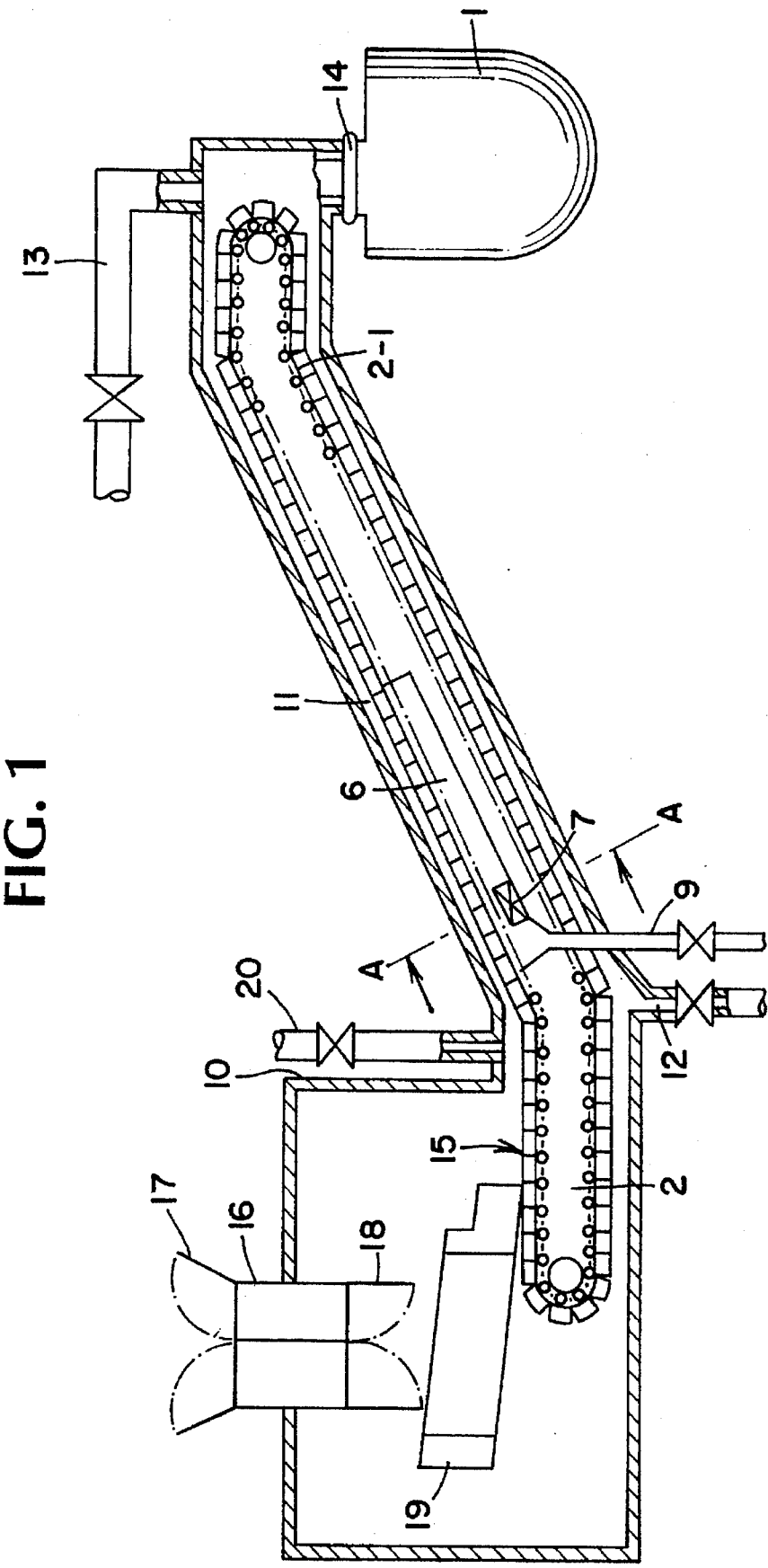
FIG. 1 is a front longitudinal sectional view of an embodiment of the present invention.
Figure 2:
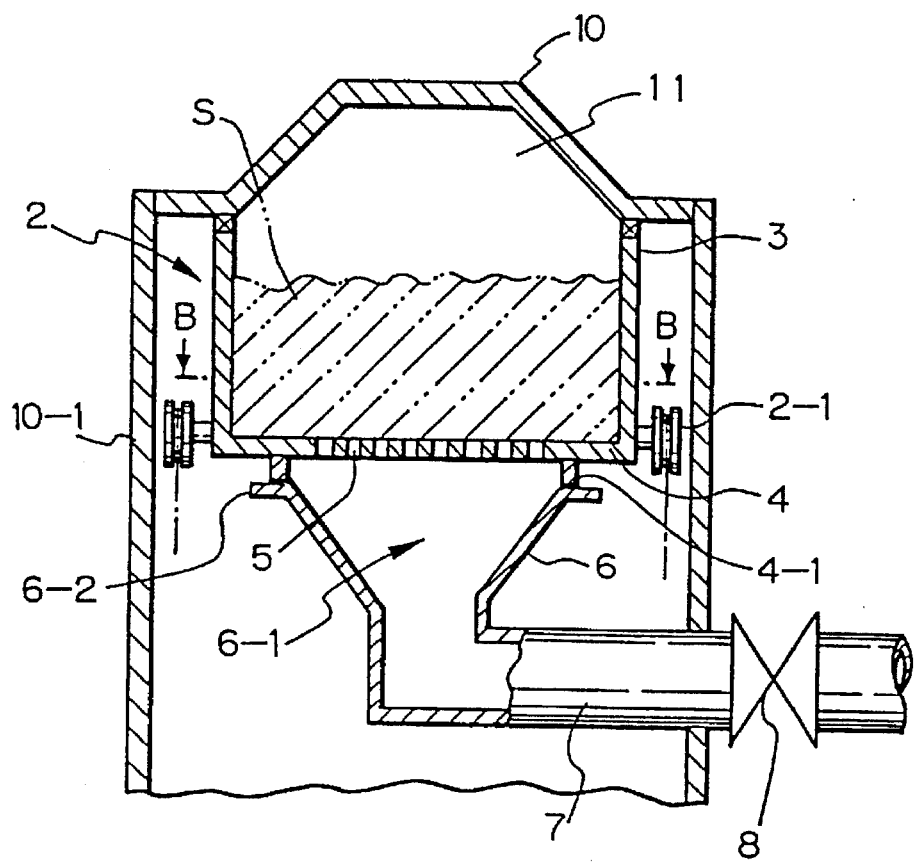
FIG. 2 is a sectional view taken along a line A—A of FIG. 1.
Figure 3:
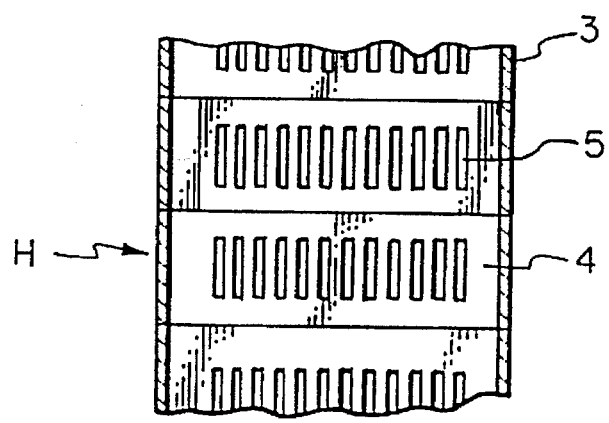
FIG. 3 is a sectional view taken along a line B—B of FIG. 2.

The apparatus shown in FIGS. 1 to 3 represents the case where an apron conveyor system is used for a conveyor.

In FIG. 1, a conveyor 2 is formed by connecting loading plate H, which comprises side plates 3 and a bottom plate 4 and is open at the upper pact thereof, by connecting members (not shown) as shown in FIGS. 2 and 3. Conveyor 2 is allowed to move from a scrap loading portion 15 to a portion near the upper part of a processing furnace 1 by a conveyor driving means 2-1. Grid-like or slit-like holes 5, that is, exhaust gas passage portions, are defined in the bottom plate 4 of the box-shaped housing.

An exhaust gas suction chamber 6 for forming an exhaust gas suction space 6-1 is disposed in an exhaust gas suction zone at an intermediate part of the route of such a conveyor corresponding to the holes described above. An exhaust gas suction duct 7 and a damper 8 are disposed inside the suction chamber.

To improve the suction force of the suction chamber described above, the gap between the upper end face of the side plates 3 and the inner surface of the gas seal cover 10 is reduced, and protuberances 4-1 are provided to the lower surface of the bottom plate 4. The gap between the end face of the protuberances and the flange 6-2 of the exhaust gas suction chamber 6 is also reduced. Since external air is prevented from entering by a gas seal cover 10, the gas seal at sliding portions in the gaps may be of a simple type.

The gas seal cover 10, which is disposed at the open portion of the processing furnace 1 through a contractile connecting pipe 14, covers the conveyor 2 and forms a flue 11 above this conveyor. Reference numeral 10-1 shows a wall of the gas seal cover 10.

A scrap reception hopper 16 is disposed above the scrap loading portion 15 of the conveyor. This hopper includes an upper cover 17 and a lower cover 18, and is provided with a scrap tapping device 19 below the lower cover. The scrap tapping device 19 charges a predetermined quantity of the scrap S into the loading plate H of the conveyor 2. While only the upper cover is exposed to atmosphere, the scrap tapping device is covered with the gas seal cover 10. Reference numeral 9 or 12 denotes a dust discharge duct for discharging the dust which stays inside the exhaust gas suction chamber 6 or inside the gas seal cover 10, and reference numeral 13 denotes a by-pass duct and reference number 13-1 denotes a by-pass damper for regulating the quantity of the exhaust gas to be introduced into the gas seal cover 10 Reference numeral 20 denotes an exhaust gas discharge duct.

In the scrap conveyor described above, the scrap S is charged into the reception hopper 16, the lower cover 18 of which is closed while the upper cover 17 of which is open, by a crane equipped with a lifting magnet. After charging of the scrap S is completed, the upper cover 17 is closed and then the lower cover 18 is opened, and the scrap S is charged into the tapping device 19. The scrap S is quantitatively tapped from the tapping device 19 into the loading plate H.

The loading plate H storing therein the scrap S is transferred to the processing furnace 1 by the operation of the chain conveyor, and is pre-heated in the interim by the high temperature exhaust gas generated from the In other words, the exhaust gas generated from the processing furnace 1 is primarily introduced into the flue 11 of the gas seal cover 10, pre-heats the surface layer portion of the scrap S inside the loading plate H by heat of radiation and convection heat transfer and is thereafter exhausted from the exhaust gas discharge duct 20 disposed in the proximity of the scrap tapping device.

In the exhaust gas chamber 6 disposed below the exhaust gas suction zone, that is, below the loading plate of the conveyor, a part or the whole quantity of the exhaust gas passing through the upper part of the scrap is sucked below the loading plate H through the scrap layer by the suction duct 7, and is discharged from the suction duct 7 while passing through the exhaust gas passage holes 5. While passing through the scrap layer, the exhaust gas primarily pre-heats the lower layer portion of the scrap S by convection heat transfer.

Incidentally, it is possible to divide the exhaust gas suction chamber 6 into a plurality of zones and to control the pre-heating temperature of the scrap S by disposing an air flow regulating damper in each of these zones.

Next, another embodiment of the invention will be explained with reference to FIGS. 4 to 6, The conveyor 21 includes a double-wall, rectangular scrap accommodation container which comprises an outer wall 24 and an inner wall 22, which are integrally molded with the bottom plate 23, and which is open at the upper part thereof. A gap space 25 is defined between the end face of the inner wall 22 and the bottom plate 23, and exhaust gas suction space 26 is defined between the inner wall 22 and the outer wall 24. The exhaust gas take-out duct 27 is fitted to the outer wall 24 and is communicated with the exhaust gas suction duct 28 through the connecting portion 29 so that the exhaust gas passing through the scrap layer can be sucked and discharged by the suction duct 28 through the exhaust gas suction space.

The periphery of the conveyor 21 is covered with the gas seal cover 30 and is cut off from the outside. The gas seal cover defines the flue 31 above the container.

To improve the suction force of the exhaust gas suction space, the conveyor 21 employs the construction wherein the gap between the upper end face of the double-wall of the container and the inner surface of the gas seal cover 30 is reduced and both of them slide. Further, the conveyor 21 employs the construction wherein vibration such as slow-push motion, quick-return motion, etc, is applied in the travelling direction of the scrap (this vibration construction is ordinary and is not therefore shown in the drawing). Such a motion sequentially transfers the scrap to the throat of the furnace. The connecting portion 29 employs the construction wherein the flange of the exhaust gas take-out duct 27 and the flange of the exhaust gas suction duct 28 slide. Accordingly, intrusion of air is prevented by disposing a simple gas seal material such as a ground packing or a labyrinth structure on the slide surface of the gas seal cover 30 and in the proximity of the slide surface of these flanges.

Figure 4:
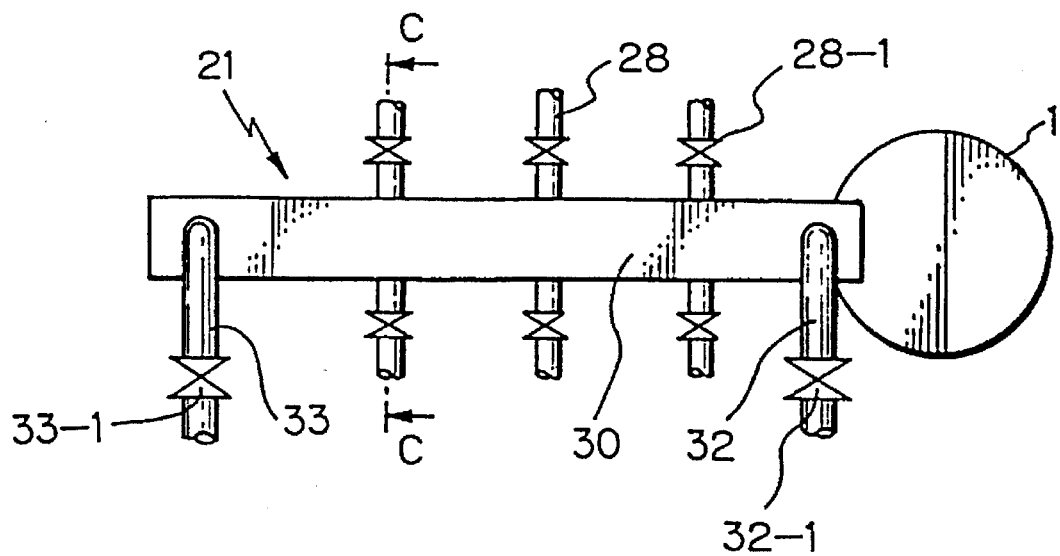
FIG. 4 is a plan view of another embodiment of the present invention.
Figure 5:
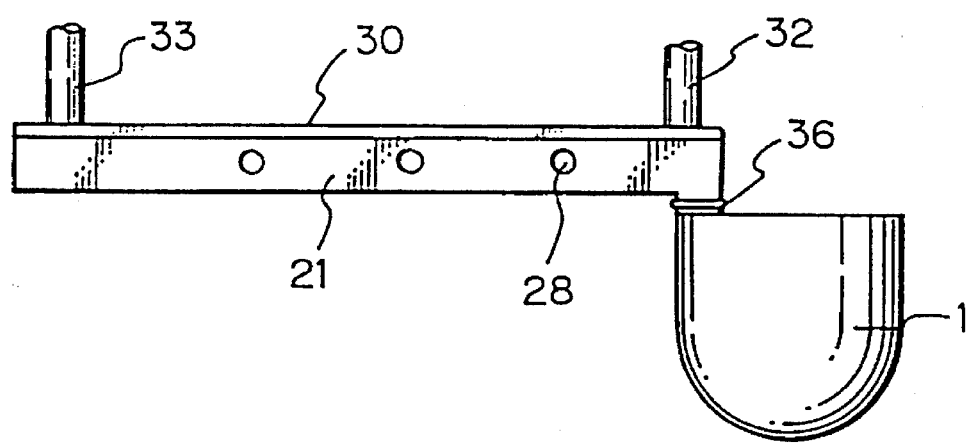
FIG. 5 is a front view of FIG. 4.

A plurality of exhaust gas suction ducts 28 each having a different duct diameter may be disposed in the travelling direction of the conveyor 21 in consideration of the balance of the pressure loss of the exhaust gas in the longitudinal direction of the conveyor 21, or a flow rate regulating valve 28-1 may be disposed as shown in FIGS. 4 and 5 without changing the duct diameter.

In the drawing, reference numeral 30-1 denotes support poles for supporting the gas seal cover 30, 32 denotes an exhaust gas bypass duct disposed at the inlet of the conveyor, 33 denotes an exhaust gas discharge duct fitted to a portion near the scrap loading portion (not shown) to which an exhaust gas prevention device such as shown) to which an exhaust gas prevention device such as an air curtain is provided, and 34 denotes a support device for the conveyor.

In the conveyor described above, the high temperature exhaust gas generated from the processing furnace 1 is fully introduced into the flue 31 of the gas seal cover through the connecting pipe 36, pre-heats the surface layer portion of the scrap inside the conveyor 21 and is then discharged from the exhaust duct 33 having a flow rate regulating valve 33-1. In the mean time, a part or the whole amount of the exhaust gas passing through the scrap is sucked by the exhaust gas suction force of a plurality of exhaust gas suction ducts 28 while passing through the scrap layer, the gap space 25, the exhaust gas suction space 26 and the exhaust gas take-out duct 27, and is discharged from the exhaust gas suction ducts 28.

In this instance, the balance of the pressure loss of the exhaust gas is regulated by a plurality of flow rate regulating valves 28-1, and these flow rate regulating valves are used under a semi-fixed state or by the remote operation. When they are fixed under the semi-fixed state, they can be determined of course by the balance of the pressure loss of the exhaust gas. Moreover, regulations can be made in such a fashion that the opening of these flow rate regulating valves 28-1 is reduced in the former half portion where the temperature of the of the exhaust gas passing through the conveyor 21 is high so as to thereby reduce the amount of the exhaust gas passing through the inside of the scrap layer and to pre-heat primarily the surface layer portion of the scrap by radiation heat, and the opening of the flow rate regulating valves 28-1 is increased in the latter half portion where the exhaust gas temperature is low, so as to thereby increase the amount of the exhaust gas passing through the inside of the scrap layer and to pre-heat primarily the scrap layer by convection heat by the exhaust gas inside the layer.

When these flow rate regulation valves are operated by remote operation, the pre-heating temperature of the scrap changes when quantities of thick scraps are locally concentrated among the scrap charged on the conveyor 21 or the charging quantity changes. In such a case, the pre-heating temperatures can be made uniform by regulating the flow rate regulating valves 28-1 in the zone through which the scrap portion passes, in the combination with a scrap position detection means on the conveyor 21 which means is disposed separately. In this way, the operation of the processing furnace 1 can be stabilized.

The pre-heating temperature of the scrap inside the conveyor 21 changes with the temperature and quantity of the exhaust gas discharged from the processing furnace 1. Accordingly, the pre-heating temperature of the scrap can be adjusted easily by regulating the flow rate regulating valves 32-1 disposed in the exhaust gas by-pass duct 32. Furthermore, the occurrence of fusion due to excessive heating of the surface portion of the scrap and oxidation of the scrap can be prevented by adjusting the quantity of the exhaust gas introduced into the conveyor 21 in accordance with the kind of the scrap.

The foregoing embodiments use the exhaust gas of the processing furnace as the pre-heating gas to be introduced into the scrap conveyor. According to still another embodiment of the present invention, another exhaust gas generation source suck as a combustor is disposed above the conveyor or at a different position and can be used so as to combine this exhaust gas with the exhaust gas of the processing furnace.

Figure 7:
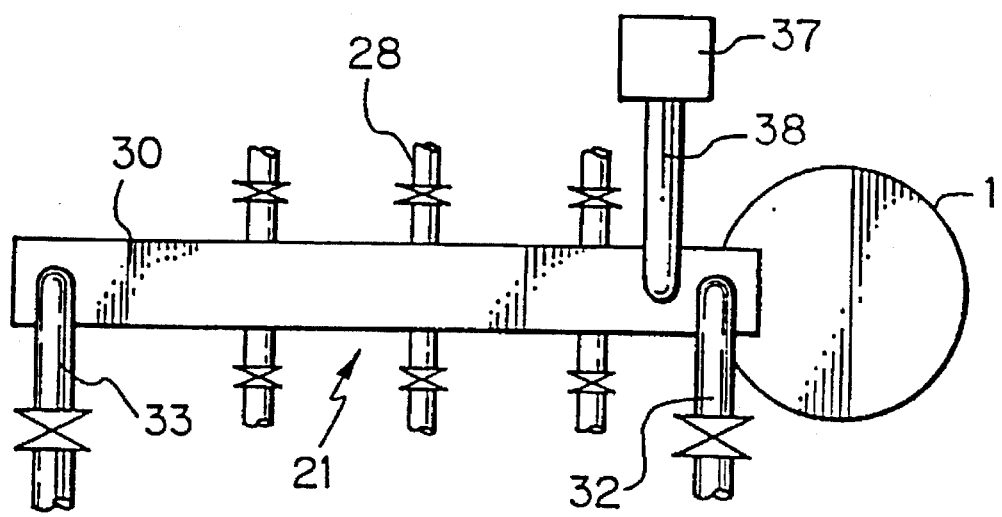
FIG. 7 is a plan view of still another embodiment of the present invention.

FIG. 7 shows such an embodiment and represents the case where a combustor 37 is disposed in proximity with the conveyor.

The exhaust gas of the combustor 37 is introduced into the conveyor 21 (or 2) through the exhaust gas duct 38, and is thereafter used for pre-heating the scrap In this embodiment, when the temperature of the exhaust gas generated by the processing furnace is low, the quantity of the combustion gas of the combustor is increased, and when the exhaust gas temperature is high, the quantity of the combustion gas is reduced. In this way, the temperature of the exhaust gas to be introduced into the conveyor can be easily controlled within a predetermined range, so that pre-heating of the scrap on the conveyor can be stably carried out.

Figure 8:
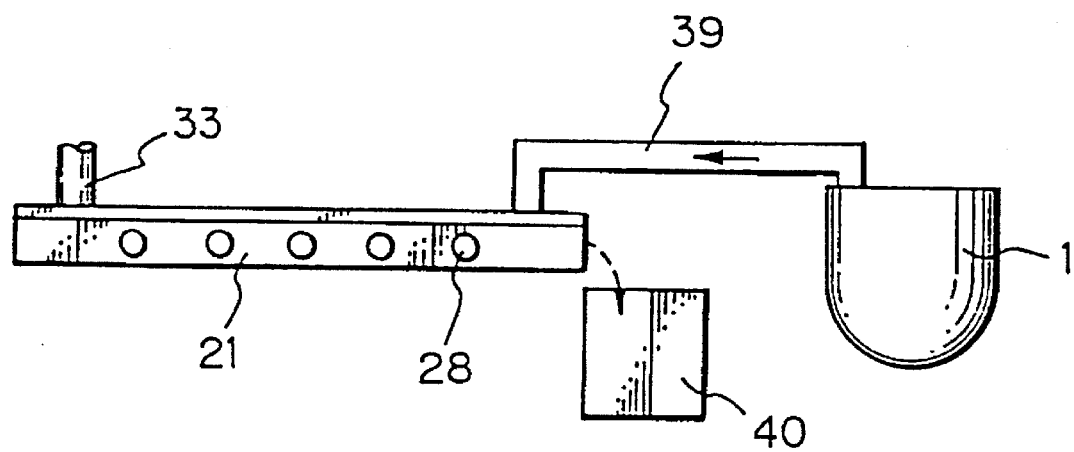
FIG. 8 is a front view of still another embodiment of the present invention.

The foregoing embodiments represent the case where the conveyor and the processing furnace are directly connected, but the present invention is not particularly limited to such an arrangement. FIG. 8 shows another embodiment of the arrangement, wherein the scrap pre-heated on the conveyor is accepted by a portable container 40 and is then loaded into the processing furnace 1.

The exhaust gas of the processing furnace 1 is introduced into the conveyor 21 through the exhaust gas duct 39 connecting the processing furnace 1 to the conveyor 21 (or 2), and is thereafter used for pre-heating the scrap in the same way as in the foregoing embodiments. On the other hand, the pre-heated scrap is stored in the portable container 40, etc, and is then charged into the processing furnace 1 by a crane, not shown, or the like.

Although the present invention has thus been explained with reference to some specific embodiments thereof, the present invention is not naturally limited thereto and can be changed or modified in various ways without departing from the scope thereof.

EXAMPLE

Figure 6:
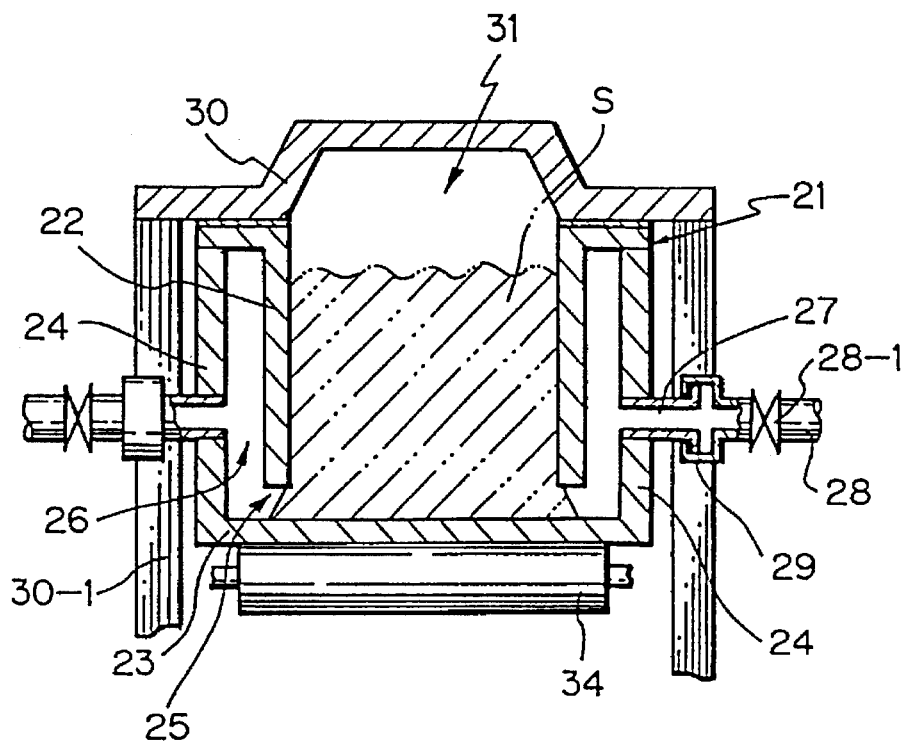
FIG. 6 is a sectional view taken along a line C—C of FIG. 4.
Figure 9:
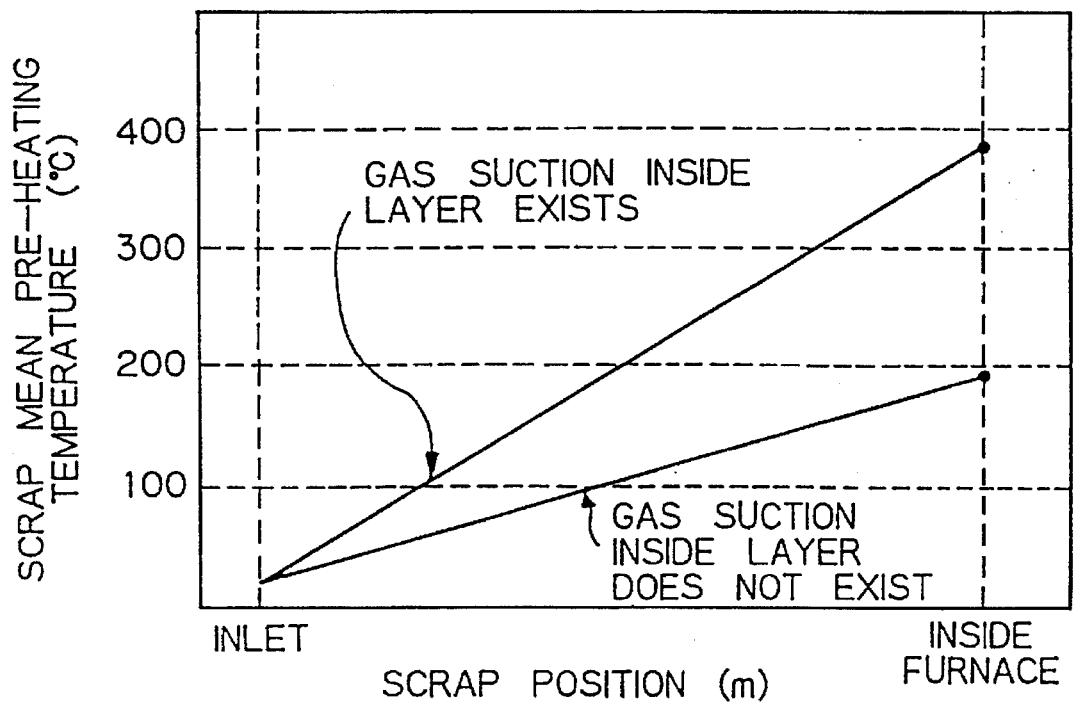
FIG. 9 is a diagram showing an example of the result of simulation of mean pre-heating temperature of a scrap.

FIG. 9 shows the result of an example of the simulation result carried out by the present inventors on the mean pre-heating temperature of the scrap in the conventional structure, where the exhaust gas merely passes above the scrap, and the mean pre-heating temperature of the scrap in the conveyor shown in FIGS. 4 to 6 of the invention. In this simulation, the exhaust gas temperature from the arc furnace 1 was 1,000° C., the exhaust gas quantity from the arc furnace was 1,000 Nm³/min, the conveying speed was 1.5 t/min, the pre-heating time of the scrap on the conveyor was 12.5 min, and the inlet side temperature of the scrap was 20° C. Furthermore, in the case of the present invention, the whole quantity of the exhaust gas was allowed to uniformly pass in the direction of the thickness of the scrap.

Under the condition described above, the mean pre-heating temperature of the scrap could be raised to about 400° C. in the present invention in comparison with the mean pre-heating temperature of about 200° C. in the prior art structure. As can be appreciated from this result, too, the present invention can greatly improve the pre-heating efficiency of the scrap, by passing the exhaust gas in the direction of the thickness of the scrap compared to the prior art structure.

INDUSTRIAL APPLICABILITY

As described above in detail, the present invention can pre-heat not only the surface layer portion but also the lower layer portion of the scrap inside the conveyor which is continuously conveyed, by utilizing the exhaust gas of the furnace generated from the initial stage of melting till the refining state, and can therefore improve heat efficiency.

Further, the temperature control of the scrap is easily adjusted by adjusting the exhaust gas quantity on the inlet side to the conveyor and the gas suction quantity inside the scrap layer, and the operation can be stabilized by making uniform the pre-heating temperature of the scrap. Fusion of the scrap of the surface layer portion and oxidation of the scrap, etc, can be prevented by limiting an excessive rise of the temperature of the surface layer portion of the scrap layer.

The effects described above can be obtained not only when the exhaust gas of the furnace is utilized but also when the exhaust gas of a combustion apparatus is utilized. When the combustion apparatus is used, the temperature of the exhaust gas introduced into the conveyor can be easily controlled within a predetermined range. Accordingly, pre-heating the scrap can be made more stable.

As described above, the present invention provides high reliability, limits the increase of the installation cost and can drastically improve heat efficiency. As a result, the present invention makes great contribution to stabilization of the operation, improvement in producibility and reduction in energy costs.

We claim:

1. A conveyor for feeding scrap to a processing furnace while preheating said scrap by exhaust gas from said processing furnace, said conveyor comprising:

a scrap charging portion;

a scrap reception hopper disposed above said scrap charging portion, said scrap reception hopper having upper and lower covers, each cover selectively movable to an open and a closed position;

a scrap conveying portion disposed between said scrap charging portion and said processing furnace;

a tapping device disposed below said scrap reception hopper for feeding scrap to said scrap conveying portion;

a gas seal cover disposed above said scrap conveying portion and said tapping device, said gas seal cover and said scrap conveying portion cooperating to define a flue above said scrap conveying portion, said flue connected in fluid communication with a processing furnace exhausting gas discharge;

exhaust gas passages provided in said scrap conveying portion;

an exhaust gas suction chamber disposed below a selected area of said scrap conveying portion, said exhaust gas suction chamber being in fluid communication with said exhaust gas passages of said scrap conveying portion in said selected area;

an exhaust gas suction duct connected in fluid communication with said exhaust gas suction chamber;

whereby processing furnace exhaust gas in said flue flows from said flue though said exhaust gas passages of said scrap conveying portion in said selected area into said exhaust gas suction chamber and then into said exhaust gas suction duct for heating scrap located in said scrap conveying portion in said selected area.

2. A conveyor according to claim 1, wherein said exhaust gas passages are formed in a bottom plate of said conveyor.

3. A conveyor according to claim 2, wherein said exhaust gas passages comprise a slit-like hole structure or a grid-like hole structure.

4. A conveyor according to claim 1, wherein said exhaust gas passages are disposed between a bottom plate and side plates of said conveyor.

5. A conveyor according to claim 4, wherein said exhaust gas passages comprise a gap space.

6. A conveyor according to claim 1, wherein another exhaust gas generation source is connected to said gas seal cover through said exhaust gas duct.

7. A conveyor according to claim 1, wherein an exhaust gas bypass duct is disposed in the proximity of an exhaust gas inlet portion of said gas seal cover.

8. A conveyor according to claim 1, wherein said scrap conveyor is divided into a plurality of zones, and a plurality of exhaust gas suction ducts are so disposed as to correspond to said zones, respectively.

9. A conveyor according to claim 2, wherein said scrap conveyor further includes an apron conveyor apparatus.

10. A conveyor according to claim 4, wherein said scrap conveyor further includes a vibration conveyor apparatus.

11. A conveyor for feeding scrap to a processing furnace while preheating said scrap by exhaust gas from said processing furnace, said conveyor comprising:

a scrap conveying portion;

a gas seal cover disposed above said scrap conveying portion, said gas seal cover and said scrap conveying portion cooperating to define a flue above said scrap conveying portion, said flue connected in fluid communication with a processing furnace exhaust gas discharge;

said scrap conveying portion comprising a bottom plate and two spaced apart side plates disposed above said bottom plate;

an exhaust gas passage disposed between said bottom plate and at least one said side plates of said scrap conveying portion;

an exhaust gas suction chamber connected in fluid communication with said exhaust gas passage;

an exhaust gas suction duct connected in fluid communication with said exhaust gas suction chamber;

whereby processing furnace exhaust gas located in said flue flows from said flue through said exhaust gas passage of said scrap conveying portion into said exhaust gas suction chamber and then into said exhaust gas suction duct for heating scrap located in said scrap conveying portion.

12. A conveyor according to claim 11, wherein said exhaust gas passage is a gap space.

13. A conveyor according to claim 11, wherein another exhaust gas generation source is connected to said gas seal cover through said exhaust gas duct.

14. A conveyor according to claim 11, wherein an exhaust gas bypass duct is disposed in the proximity of an exhaust gas inlet portion of said gas seal cover.

15. A conveyor according to claim 11, wherein said scrap conveyor is divided into a plurality of zones, and a plurality of exhaust gas suction ducts are so disposed as to correspond to said zones, respectively.

16. A conveyor according to claim 11, wherein said scrap conveyor further includes a vibration conveyor apparatus.

* * * * *